Oct. 13, 1936.   C. L. BAUSCH   2,057,179
OPHTHALMIC LENS AND METHOD OF MAKING SAME
Original Filed Nov. 11, 1933

CARL L. BAUSCH
INVENTOR

BY *(signature)*
ATTORNEY

Patented Oct. 13, 1936

2,057,179

UNITED STATES PATENT OFFICE 2,057,179

OPHTHALMIC LENS AND METHOD OF MAKING SAME

Carl L. Bausch, Rochester, N. Y., assignor to Bausch & Lomb Optical Company, Rochester, N. Y., a corporation of New York Application November 11, 1933, Serial No. 697,629
Renewed April 23, 1936

11 Claims. (Cl. 88—54)

This invention relates to ophthalmic lenses and more particularly it relates to multifocal lenses having a colored peripheral zone.

One of the objects of my invention is to provide an improved multifocal lens having a central clear portion, a colored peripheral zone of graded intensity and a clear reading portion bounded by clear and colored portions. Another object is to provide an improved method of making such a lens whereby it can be cheaply and efficiently produced on a commercial scale. These and other objects and advantages reside in certain novel features of construction, arrangement and combination of parts and in the method of constructing and arranging same as will hereinafter be more fully described and pointed out in the appended claims.

Referring to the drawing.

Figure 8:
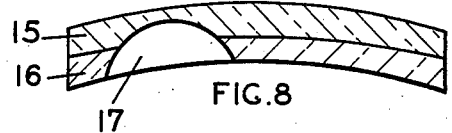
Figure 9:
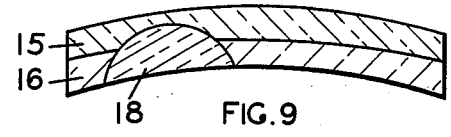
Figure 10:
Figure 3:
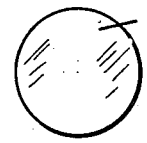
Fig. 3 is a face view of a segment of glass.

Figs. 8, 9, and 10 illustrate the manner of placing the segment on the concave side of the lens.

Figure 11:
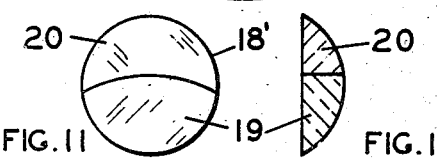
Figure 12:
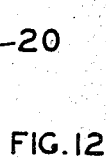

Figs. 11 and 12 show a modified type of segment.

Figure 13:
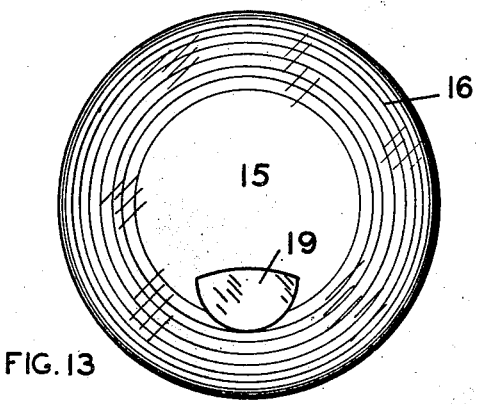

Fig. 13 is a face view of a finished lens embodying the modified segment.

Figure 1:
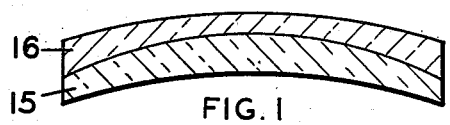
Fig. 1 is a sectional view of two superposed pieces of glass which have been joined together.
Figure 2:
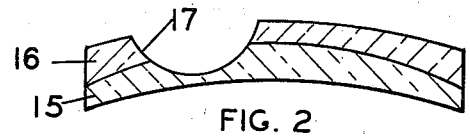
Fig. 2 is a similar view after a countersink has been formed therein.
Figure 5:
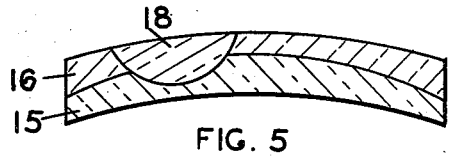
Fig. 5 shows the segment fused in the countersink.
Figure 6:
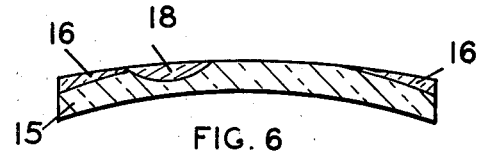
Fig. 6 shows a vertical section of the finished lens.
Figure 7:
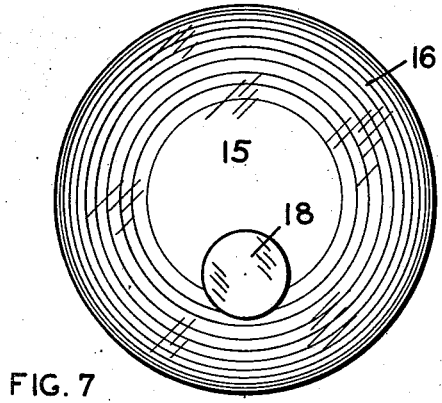
Fig. 7 is a face view of the finished lens.
Figure 4:
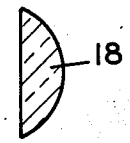
Fig. 4 is a sectional view thereof.

A preferred embodiment of my invention is shown in the drawing wherein 15 indicates a piece of clear glass, such as ordinary crown optical glass, for example, on the top of which is placed the piece of glass 16 which is colored or tinted in any desirable color or shade. These two pieces of glass are permanently joined together as by fusion in a furnace, for example. A countersink 17 is then ground into these pieces of glass with the countersink passing entirely through the colored glass 16 and into the clear glass 15 as shown in Fig. 2. A clear glass segment 18 having a refractive index higher than that of members 15 and 16 such as flint glass, for example, is then prepared with a polished convex surface as shown in Fig. 4. This segment is then fused in the countersink 17 to provide the structure shown in Fig. 5. This composite lens is then ground and polished so as to provide the lens shown in Fig. 6. During this grinding and polishing process the central portion of the colored glass 16 is removed and a portion of segment 18 is also removed, thus leaving an annular member of colored glass around the periphery of the lens. The thickness of this portion of colored glass decreases from the edge inwardly so that the light transmitting power of the lens increases gradually from the edge to the central portion. Since the segment 18 is made of clear glass the finished lens will appear as in Fig. 7 with the reading segment bounded by a clear portion and by a colored portion.

In the modified form shown in Figs. 8–10 the colored glass 16 is fused to the concave side of the clear glass member 15 and the countersink 17 is formed on the concave side. The segment 18 is fused in the countersink and the concave side of the composite structure is then ground and polished so as to provide a lens having a vertical section as shown in Fig. 10.

A modified type of segment shown in Figs. 11 and 12 could be fused in the countersink 17. This segment 18' comprises a lower portion 19 of a high index flint glass, for example, to which is fused a piece of glass 20 having substantially the same index as that of members 15 and 16. This composite segment 18' is then fused in countersink 17 and since portion 20 is of the same index as 15 the two are merged upon fusion so that the lens will appear as in Fig. 13. In this lens the reading segment 19 is bordered by the colored portion and also by the clear portion as in the lens in Fig. 7.

From the foregoing it will be apparent that I am able to attain the objects of my invention and provide an improved lens and method of making the same. The lens has a central clear portion and a colored outer zone of graduated intensity with a reading segment of clear glass bordered by colored and clear portions. Various modifications can obviously be made without departing from the spirit of my invention.

I claim:

1. An ophthalmic lens comprising refractive material, said lens having an annular colored portion adjacent to its periphery and a clear central portion, said portions having the same dioptric power for distant vision, said lens also having a clear reading portion of different dioptric power, said reading portion being bounded partially by said colored portion and partially by said clear portion.

2. An ophthalmic lens comprising a clear glass base, an annular piece of colored glass joined to said base, said piece of colored glass having a thickness which decreases from the periphery inwardly, and a segment of clear glass secured to said base and colored piece of glass, said segment having a refractive index which is different from that of the base and the piece of colored glass, said segment being partially bounded by said piece of colored glass.

3. An ophthalmic lens comprising a clear glass base, a colored glass portion fused to said base, said portion having a thickness which varies radially whereby the lens has different areas with different light transmitting powers, and a segment of clear glass fused to said base to provide a clear reading portion, said segment having a refractive index which is different from that of said base.

4. An ophthalmic lens comprising a clear glass base, an annular piece of colored glass fused to said base, said piece of glass having a thickness which decreases from the periphery of the lens inwardly, and a segment of clear glass fused to said base, said segment having a higher refractive index than said base whereby a multifocal lens is provided.

5. A method of making ophthalmic lenses which comprises joining together a colored glass member and a clear glass member, forming a countersink by grinding through said colored member into said clear member, fusing into said countersink a segment of clear glass having a refractive index higher than that of said glass member so that said segment is bounded partly by the clear and partly by the colored glass portion.

6. A method of making ophthalmic lenses which comprises fusing together a clear piece of glass and a colored piece of glass, grinding a countersink through said colored glass and into said clear glass, fusing in said countersink a segment of glass having a higher refractive index than said other piece of glass, and grinding away the central portion of said colored piece of glass.

7. A method of making ophthalmic lenses which comprises fusing together two superposed pieces of glass, one of said pieces being colored, forming a countersink by grinding through said colored piece and into the other piece, fusing into said countersink a segment of glass having a higher refractive index than the other pieces of glass and grinding away a portion of said segment and the central portion of said colored piece of glass.

8. A method of making multifocal lenses which comprises joining together two pieces of glass having different light transmitting properties, grinding a countersink through the piece of glass having the lowest light transmitting properties and into the other piece, fusing into said countersink a segment of glass having a higher refractive index than said pieces, and then grinding away the central portion of the piece of glass having the lowest light transmitting properties.

9. An ophthalmic lens comprising a glass base, an annular glass member fused to said base, the light transmitting properties of said base being greater than said member, a segment of glass embedded in said base, said segment having substantially the same light transmitting properties as but a greater refractive index than said base, the edge of said segment being bounded partially by said base and partially by said member.

10. An ophthalmic lens comprising a glass base, an annular glass member fused to said base and a segment of glass embedded in said base, said segment and said base having greater light transmitting powers than said member, said segment having a refractive index higher than that of said base, said segment being bounded partially by said base and partially by said member.

11. An ophthalmic lens comprising a glass base, an annular glass member fused to said base, said member having a thickness which decreases inwardly from the periphery of the lens and a segment of glass embedded in said base, said segment and said base having greater light transmitting powers than said member, said segment having a refractive index which is higher than that of the base and member.

CARL L. BAUSCH.